United States Patent
Avery et al.

(10) Patent No.: US 11,429,651 B2
(45) Date of Patent: Aug. 30, 2022

(54) DOCUMENT PROVENANCE SCORING BASED ON CHANGES BETWEEN DOCUMENT VERSIONS

(71) Applicant: International Business Machines Corporation, Armonk, NY (US)

(72) Inventors: Kenytt D. Avery, Newport Beach, CA (US); Edward L. Bader, Los Angeles, CA (US); Jean-Marc Costecalde, Irvine, CA (US); Chi M. Nguyen, Irvine, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/804,862

(22) Filed: Mar. 14, 2013

(65) Prior Publication Data

US 2014/0280204 A1 Sep. 18, 2014

(51) Int. Cl.
*G06F 16/33* (2019.01)
*G06F 16/245* (2019.01)
(Continued)

(52) U.S. Cl.
CPC ........ *G06F 16/3334* (2019.01); *G06F 16/245* (2019.01); *G06F 16/313* (2019.01);
(Continued)

(58) Field of Classification Search
CPC ... G06F 17/30309; G06F 8/33; G06F 16/2329
(Continued)

(56) References Cited

U.S. PATENT DOCUMENTS

| 5,806,078 A | 9/1998 | Hug et al. |
| 5,890,164 A | 3/1999 | Nielsen |

(Continued)

FOREIGN PATENT DOCUMENTS

| CN | 1794207 A | 6/2006 |
| WO | 06026636 A2 | 3/2006 |
| WO | 2011150027 | 1/2011 |

OTHER PUBLICATIONS

International Search Report and Written Opinion in counterpart International Application No. PCT/IB2012/052734 dated Oct. 18, 2012.

(Continued)

*Primary Examiner* — Brittany N Allen
(74) *Attorney, Agent, or Firm* — Edell, Shapiro & Finnan, LLC

(57) ABSTRACT

A computer-implemented method, system and computer program product is provided for optimizing a document change or provenance scoring system by weighting sections of a document, scoring the changes for each section, and then combining the change scores for each section to generate an overall change score. An associated report may also be generated that catalogs all of the various scoring elements. The weighted score is stored in a document management system and provides a human document reviewer a level of detail to evaluate document changes. Accordingly, the weighted score reveals whether a document's changes require a brief or detailed review before the document's changes are approved for a next document version.

16 Claims, 5 Drawing Sheets

(51) Int. Cl.

| | | |
|---|---|---|
| *G06F 16/31* | (2019.01) | |
| *G06F 16/338* | (2019.01) | |
| *G06F 16/93* | (2019.01) | |
| *G06Q 10/10* | (2012.01) | |
| G06F 16/34 | (2019.01) | |
| G06F 16/14 | (2019.01) | |

(52) U.S. Cl.
CPC ............ *G06F 16/338* (2019.01); *G06F 16/93* (2019.01); *G06Q 10/101* (2013.01); *G06Q 10/103* (2013.01); *G06F 16/148* (2019.01); *G06F 16/345* (2019.01)

(58) Field of Classification Search
USPC .......................................................... 707/751
See application file for complete search history.

(56) References Cited

U.S. PATENT DOCUMENTS

| | | | |
|---|---|---|---|
| 5,898,836 A * | 4/1999 | Freivald ................ G06F 16/958 | 709/218 |
| 5,999,947 A | 12/1999 | Zollinger et al. | |
| 6,108,670 A | 8/2000 | Weida et al. | |
| 6,681,369 B2 | 1/2004 | Meunier et al. | |
| 7,051,009 B2 | 5/2006 | Suermondt et al. | |
| 7,610,545 B2 | 10/2009 | Wagner et al. | |
| 7,693,864 B1 | 4/2010 | Pasupathy et al. | |
| 7,721,259 B2 | 5/2010 | Heinke et al. | |
| 7,953,724 B2 | 5/2011 | Griffith | |
| 7,987,172 B1 * | 7/2011 | Carver .......................... 707/709 | |
| 8,250,037 B2 | 8/2012 | Andersen et al. | |
| 8,284,198 B1 | 10/2012 | Hackworth et al. | |
| 8,386,460 B1 * | 2/2013 | Alpert ............... G06F 17/30864 | 707/709 |
| 8,538,989 B1 * | 9/2013 | Datar ........................... 707/780 | |
| 8,555,157 B1 * | 10/2013 | Fu ............................... 715/234 | |
| 8,587,613 B2 * | 11/2013 | Wang ................. G06K 9/00442 | 345/156 |
| 8,825,759 B1 * | 9/2014 | Jackson ................... H04L 67/02 | 709/204 |
| 8,839,100 B1 * | 9/2014 | Orofino, II .......... G06F 17/2288 | 715/205 |
| 8,943,197 B1 * | 1/2015 | Taylor ................ G06F 17/2247 | 709/224 |
| 8,949,242 B1 * | 2/2015 | Lin .......................... G06F 16/36 | 707/739 |
| 9,015,118 B2 | 4/2015 | Velasco | |
| 9,286,334 B2 | 3/2016 | Velasco | |
| 9,384,193 B2 | 7/2016 | Velasco | |
| 9,418,065 B2 | 8/2016 | Avery et al. | |
| 9,465,504 B1 * | 10/2016 | Jurgens ................ G06Q 10/103 | |
| 2002/0023097 A1 | 2/2002 | Ripley | |
| 2002/0049738 A1 * | 4/2002 | Epstein ................. G06F 16/951 | |
| 2002/0073138 A1 | 6/2002 | Gilbert et al. | |
| 2002/0123988 A1 | 9/2002 | Dean et al. | |
| 2003/0130993 A1 * | 7/2003 | Mendelevitch ... G06F 17/30707 | |
| 2004/0003352 A1 * | 1/2004 | Bargeron ................ G06F 17/24 | 715/230 |
| 2004/0010522 A1 * | 1/2004 | Shulok ............. G06F 17/30368 | |
| 2004/0019846 A1 | 1/2004 | Castellani et al. | |
| 2005/0060281 A1 | 3/2005 | Bucher et al. | |
| 2005/0071741 A1 * | 3/2005 | Acharya ........... G06F 17/30864 | 715/208 |
| 2005/0120294 A1 * | 6/2005 | Stefanison ............. G06Q 10/10 | 715/223 |
| 2005/0154761 A1 * | 7/2005 | Lee et al. .................... 707/104.1 | |
| 2005/0165865 A1 | 7/2005 | Farmer | |
| 2006/0004886 A1 | 1/2006 | Green et al. | |
| 2006/0070019 A1 * | 3/2006 | Vishnumurty ....... G06Q 10/103 | 717/101 |
| 2006/0080369 A1 | 4/2006 | Razdow et al. | |
| 2006/0085738 A1 | 4/2006 | Chapus et al. | |
| 2006/0143243 A1 | 6/2006 | Polo-Malouvier et al. | |
| 2006/0206462 A1 * | 9/2006 | Barber ................ G06F 16/3331 | |
| 2006/0288081 A1 | 12/2006 | Sung et al. | |
| 2007/0088957 A1 | 4/2007 | Carson | |
| 2007/0118572 A1 | 5/2007 | Fischer et al. | |
| 2007/0294246 A1 | 12/2007 | Evans et al. | |
| 2008/0021922 A1 | 1/2008 | Hailpern et al. | |
| 2008/0040388 A1 | 2/2008 | Petri et al. | |
| 2008/0126399 A1 | 5/2008 | MacGregor | |
| 2008/0134025 A1 * | 6/2008 | Harada .................... G06F 17/24 | 715/255 |
| 2008/0177755 A1 | 7/2008 | Stern et al. | |
| 2008/0178302 A1 | 7/2008 | Brock et al. | |
| 2008/0195509 A1 | 8/2008 | Bellacicco et al. | |
| 2008/0201381 A1 | 8/2008 | Desai et al. | |
| 2008/0228574 A1 * | 9/2008 | Stewart .................. G06Q 40/04 | 705/14.69 |
| 2008/0270462 A1 | 10/2008 | Thomsen | |
| 2008/0275859 A1 | 11/2008 | Griffith | |
| 2009/0024608 A1 | 1/2009 | Deolalikar | |
| 2009/0063535 A1 * | 3/2009 | Petri ................. G06F 17/30011 | |
| 2009/0125382 A1 | 5/2009 | Delepet | |
| 2009/0182780 A1 | 7/2009 | Wong et al. | |
| 2009/0199090 A1 | 8/2009 | Poston et al. | |
| 2009/0204595 A1 | 8/2009 | Dombrowski | |
| 2009/0234833 A1 | 9/2009 | Davis, II et al. | |
| 2009/0241198 A1 * | 9/2009 | Takagi ................ G06F 21/6209 | 726/26 |
| 2009/0271450 A1 * | 10/2009 | Bush ................. G06F 17/30011 | |
| 2009/0276378 A1 * | 11/2009 | Boguraev ............. G06F 17/218 | 706/12 |
| 2009/0307137 A1 | 12/2009 | White et al. | |
| 2009/0319910 A1 | 12/2009 | Escapa et al. | |
| 2010/0107244 A1 | 4/2010 | Li et al. | |
| 2010/0114628 A1 | 5/2010 | Adler et al. | |
| 2010/0251374 A1 | 9/2010 | Dill et al. | |
| 2010/0287204 A1 | 11/2010 | Amini et al. | |
| 2010/0299339 A1 | 11/2010 | Kementsietsidis et al. | |
| 2011/0047056 A1 | 2/2011 | Overman et al. | |
| 2011/0296507 A1 | 12/2011 | Khosrowshahi | |
| 2011/0313848 A1 | 12/2011 | Vaidyanathan et al. | |
| 2012/0254048 A1 | 10/2012 | Roberts et al. | |
| 2012/0254128 A1 | 10/2012 | Bath et al. | |
| 2012/0284344 A1 * | 11/2012 | Costenaro ............ G06F 17/241 | 709/206 |
| 2013/0018848 A1 | 1/2013 | Velasco | |
| 2013/0018858 A1 | 1/2013 | Velasco | |
| 2013/0018873 A1 | 1/2013 | Velasco | |
| 2013/0198145 A1 | 8/2013 | Avery et al. | |
| 2014/0013247 A1 * | 1/2014 | Beechuk ................ H04L 65/403 | 715/753 |
| 2014/0025645 A1 | 1/2014 | Brown et al. | |
| 2014/0032513 A1 | 1/2014 | Gaither | |
| 2014/0149857 A1 * | 5/2014 | Vagell ...................... G06F 17/24 | 715/255 |
| 2014/0195312 A1 * | 7/2014 | Ansel ................ G06Q 10/06398 | 705/7.42 |
| 2014/0379657 A1 | 12/2014 | Avery et al. | |

OTHER PUBLICATIONS

Friedrich II, John R, "Meta-data Version and Configuration Management in Multi-Vendor Environments", Proceedings of the ACM SIGMOD International Conference on Management of Data, p. 799-804, 2005, SIGMOD 2005: Proceedings of the ACM SIGMOD International Conference on Management of Data, ACMs.
FortiDB Version 3.2 Metadata Monitor User Guide, www.fortinet.com, Dec. 19, 2008.
M. Gao, "Recording How—Provenance on Probabilistic Databases", 2010 12th International Asia-Pacific Web Conference, Shanghai, China, pp. 205-211
P. Groth, "A Distributed Algorithm for Determining the Provenance of Data", Fourth IEEE International Conference on eScience, 2008, pp. 166-173.
IBM, ip.com PriorArtDatabase, "System and Methods to Enable Trusted Provenance Tracking and Rights/Responsibilities Evaluation in Collaborative Developing Environment", Oct. 17, 2006 (8 pages).

(56) References Cited

OTHER PUBLICATIONS

Y. Simmhan, "A Framework for Collecting Provenance in Data-Centric Scientific Workflows", IEEE International Conference on Web Services, 2006, Bloomington, IN, (8 pages).
U.S. Appl. No. 13/555,559, filed Jul. 23, 2012.
U.S. Appl. No. 13/358,594, filed Jan. 26, 2012.
International Search Report and Written Opinion; PCT/EP2013/050160; dated May 6, 2013; 8 pages.
Xuezhi Wang et al., ADANA: Active Name Disambiguation, 2011, IEEE, 794-803.

* cited by examiner

DOCUMENT PROVENANCE SCORING BASED ON CHANGES BETWEEN DOCUMENT VERSIONS

BACKGROUND

1. Technical Field

Present invention embodiments relate to scoring changes in a document, and more specifically, to generating a provenance score for changes between document versions by weighting various document sections.

2. Discussion of the Related Art

In a document or content management system (CMS), tracking changes between versions of a document is relevant for a reviewer in the document approval process. Typically, changes in the contents of a document are measured based on the number of words changed, where each word is treated equally, and is generally expressed as a numeric "provenance" value, e.g., based on a number of words that changed from one version of the document to the next. However, in many circumstances, documents may contain various sections with different levels of importance. For example, changes in a document's introduction section may not be as significant as changes in a document's body, summary or abstract sections.

One current solution is to review a document manually. When a change is made to the document, the reviewer reviews the document, and evaluates the significance of the changes. A manual review process is both costly and time consuming since many changes are to merely fix spelling and grammar errors. In other cases, document editing merely changes words in the table of contents or the introduction, yet these changes still require the reviewer to read and approve all of these minor document changes.

BRIEF SUMMARY

According to one embodiment of the present invention, a system is provided for indicating a degree of changes within a document and includes at least one processor. The system partitions the document into a plurality of sections. Each section of the document is assigned a corresponding weight value. A quantity of changes within each section is determined and the corresponding weight values are applied to the quantity of changes to produce a section value for each section. A change value is determined for the document indicating the degree of changes based on the section values. Embodiments of the present invention further include a method and program product for indicating a degree of changes substantially in the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments provide a document change or provenance scoring system. The provenance score is determined by weighting sections of a document, scoring the changes for each section, and then combining the change scores for each section to generate an overall change score or weighted change score. An associated report may also be generated that catalogs all of the various scoring elements. The change score is forwarded to a document management system and/or to a human reviewer and provides a mechanism to evaluate document changes. The change score is stored in a document management system and provides a human document reviewer a level of detail to evaluate document changes. Accordingly, the change score reveals whether a document's changes require a brief or detailed review before the document's changes are approved for a next document version.

Figure 1:
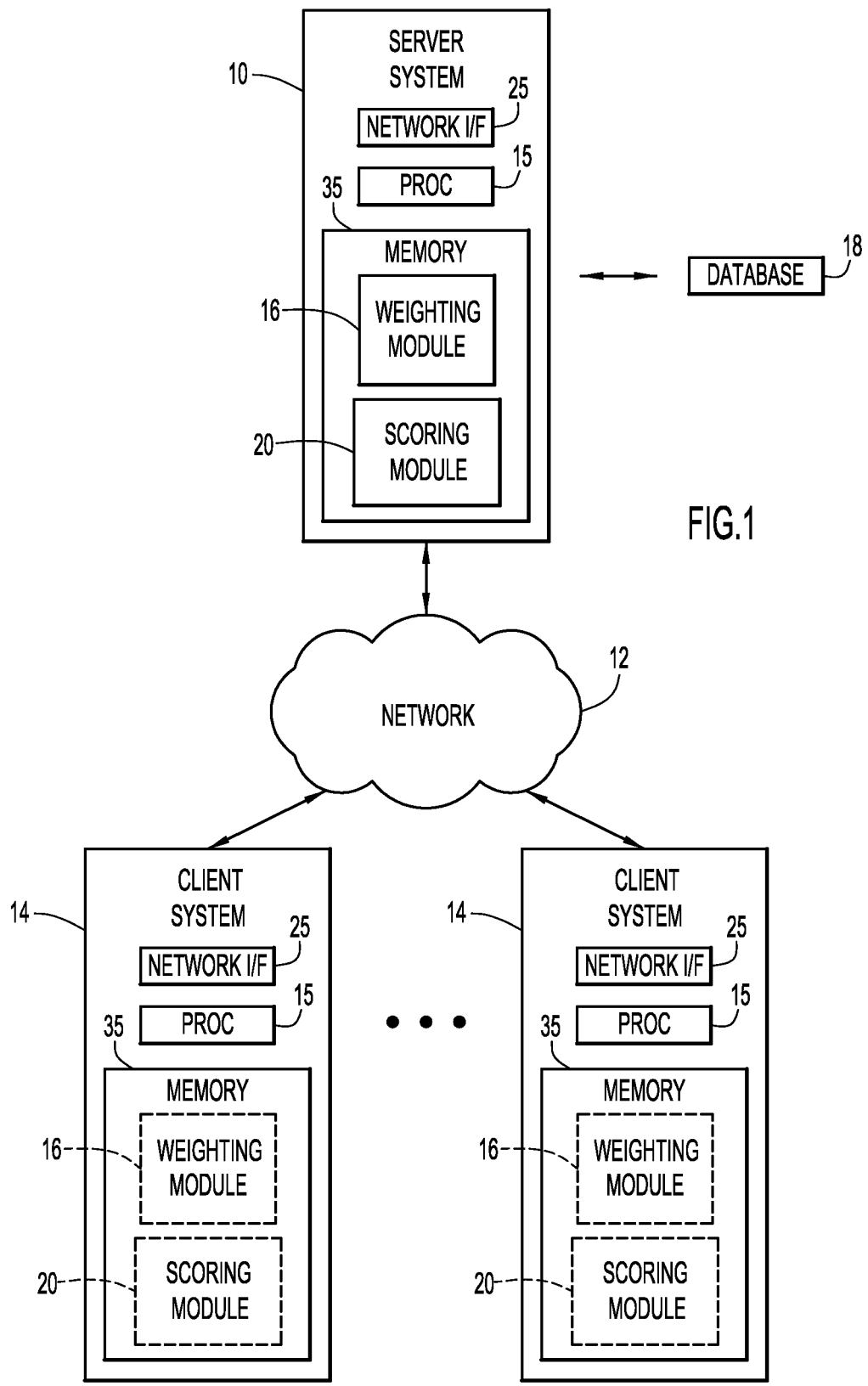
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, intranet, etc.). Alternatively, server systems 10 and client systems 14 may be local to each other, and communicate via any appropriate local communication medium (e.g., local area network (LAN), hardwire, wireless link, intranet, etc.).

Client systems 14 enable users to provide request information related to desired documents (e.g., documents, web sites, news stories, etc.) to server systems 10. In another example, the information and requests may be provided directly to the server. The server systems include a weighting module 16 to generate and assign weights to various sections of a document (e.g., the introduction, body, abstract, etc.), and a scoring module 20 to score the document based on changes in the document from one version of the document to the next. A database system 18 may store various information for weighting and scoring documents (e.g., collections of documents, document section weight values, and change scores, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, intranet, etc.). The client systems may present a graphical user (e.g., GUI, etc.) or other interface (e.g., command line prompts, menu screens, etc.) to solicit information from users pertaining to document scoring, and may provide reports including document change scores (e.g., document links, document version change history, etc.)

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, weighting module, scoring module, browser/interface software, etc.).

Alternatively, one or more client systems 14 may perform document change scoring when operating as a stand-alone unit. In a stand-alone mode of operation, the client system stores or has access to the data (e.g., document links, document section weight values, etc.), and includes weighting module 16 and scoring module 20 to perform document change scoring. The graphical user (e.g., GUI, etc.) or other interface (e.g., command line prompts, menu screens, etc.) solicits information from a corresponding user pertaining to database searches, and may provide reports including search results (e.g., document links, document relevance scores, etc.)

Weighting module 16 and scoring module 20 may include one or more modules or units to perform the various functions of present invention embodiments described below. The various modules (e.g., weighting module, scoring module, etc.) may be implemented by any combination of any quantity of software and/or hardware modules or units, and may reside within memory 35 of the server and/or client systems for execution by processor 15

Figure 2:
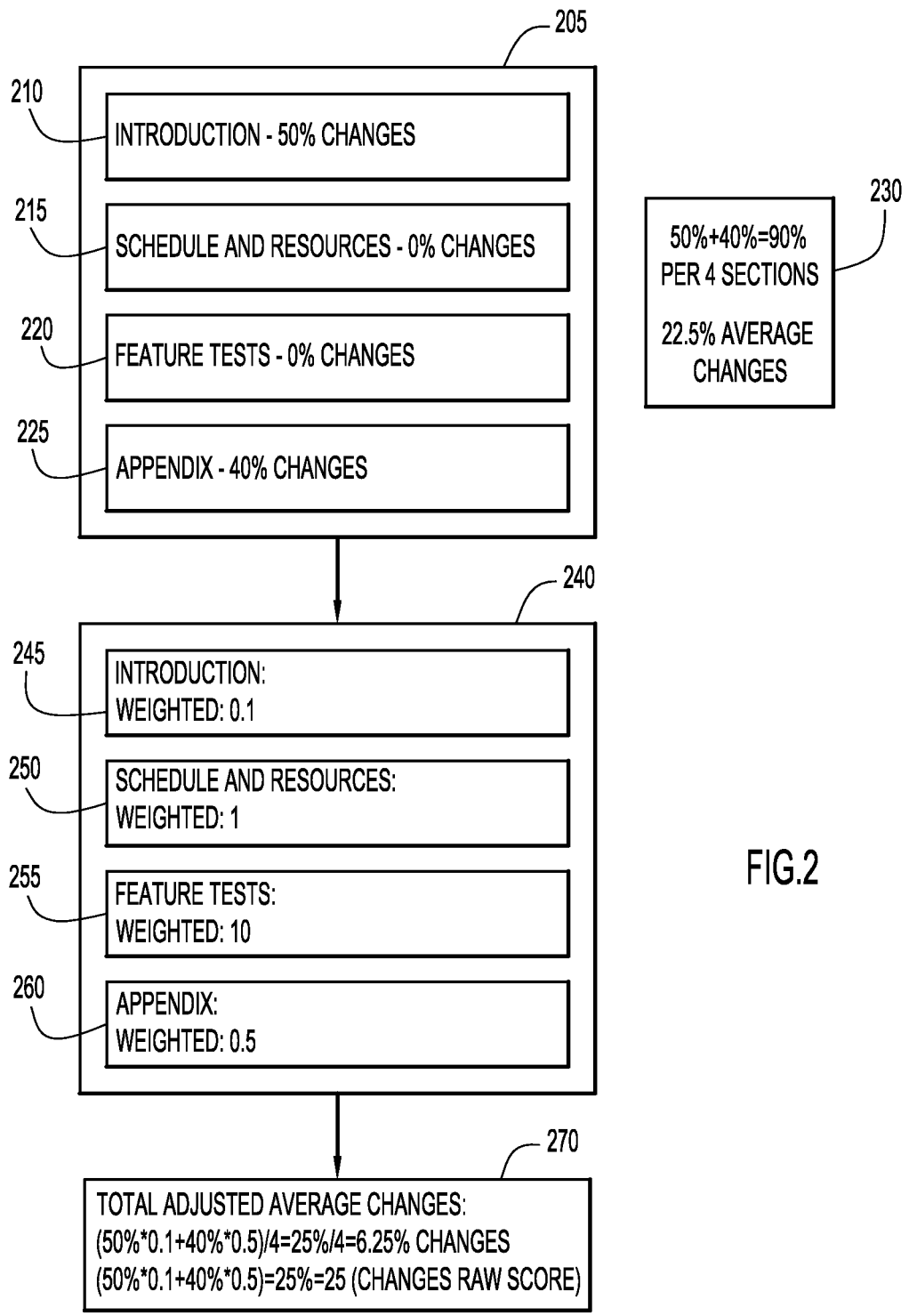
FIG. 2 is a flow chart diagram illustrating a manner in which example document sections are weighted and scored based on changes in insignificant sections according to an embodiment of the present invention.

A first example of a manner in which weighting module 16 and scoring module 20 (e.g., via a server system 10 and/or client system 14) performs document change scoring for a document with changes to insignificant sections according to an embodiment of the present invention is illustrated in FIG. 2. As viewed in FIG. 2, there is a document section 205, a weighting section 240, and a scoring section 270. A test plan document revised from an original test plan is depicted in abstract form at 205. The document has four sections, an introduction 210, a schedule and resources section 215, a feature tests section 220, and an appendix 225.

The introduction 210 has 50% changes, schedule and resources section 215 and feature tests section 220 both have 0% changes, while appendix 225 has 40% changes. Many techniques are available for determining changes between documents versions. For example, lines or words from a document may be added, removed, or changed. Given that an original document starts with 10 lines and then the original document is edited by removing three lines to produce a second version, changes can be determined in a number of ways. A first possible technique is to produce changes relative to the original document. For example, the percentage of change could be 3 lines out of 10 or 30% ((3 lines/10 lines*100%)=30%). In another example, the change could be a percentage of original content remaining in the second version or 7 lines. The percent of the original content is computed to be 70% ((7 lines/10 lines*100%)=70%).

A second technique is to produce a change percentage relative to the second version. For example, the change percentage could be 3 lines out of 7 remaining lines or approximately 43% ((3 lines/7 lines*100%)=~43%). In another example, the change percentage could be a percentage of original content remaining in the second version or 70% ((7 lines/10 lines*100%)=70%). The same calculations apply when the number of original words and changed/deleted words are used instead of a number of lines. Since the techniques described herein contemplate tracking a document across plural revisions (e.g., original, version 2, version 3, etc.) scoring based on a previous version or sections thereof, or across several pervious versions, provides a consistent and intuitive scoring technique.

At this point, a simple change score may be calculated or generated at 230. The change percentages from introduction 210 and appendix 225 are averaged across all four document sections, i.e., introduction 210, schedule and resources section 215, feature tests section 220, and appendix 225. The 50% and 40% changes from introduction 210 and appendix 225, respectively add up to 90% changes that are divided by four (sections) to yield and average change of 22.5% per section as indicated at 230. Document changes and change percentages may be determined at the time of version storage in advance and stored on one of server systems 10 or client systems 14. Alternatively, documents change percentages may be generates as part of executing weighting module 16 and/or scoring module 20 at run time.

However, in order to provide a more complete score according to the techniques described herein, the weighting section 240 provides a relative weight for each section of a particular document, i.e., weights 245, 250, 255, and 260, for document sections, 210, 215, 220, and 225, respectively. The weights may be those entered at step 410 or generated automatically (e.g., as generated by weighting module 16) using known characteristics of the terms employed within a document (e.g., using linguistic analysis). In this example, introduction 210 is given a weight 245 of 0.1, scheduling section 215 is given a weight 250 of 1.0, feature test section 220 is given a weight 255 of 10.0, and appendix 225 is given a weight 260 of 0.5. Thus, the range of weights from weight 255 of 10.0 to weight 245 of 0.1 indicates that changes in the feature test section 220 is considered to be one hundred times more relevant than changes in introduction 210 (i.e., weight 255 of 10.0 divided by a weight 245 of 0.1 is equal to 100 (10.0/0.1)).

Once changes in the various document sections 205 are determined or identified, the weights can be applied to each document section 210, 215, 220, and 225 in document 205 in weighting section 240. Potential change scores are calculated by scoring section 270 (e.g., by way of scoring module 20). Scoring section 270 shows two possible change scoring values. The first is a raw change score of 25% or 25 as calculated in the lower part of scoring section 270. The upper score in section 270 is the same score of 25 divided by the number of document sections, in this case 4, to yield a score of 6.25% changes or 6.25.

Figure 3:
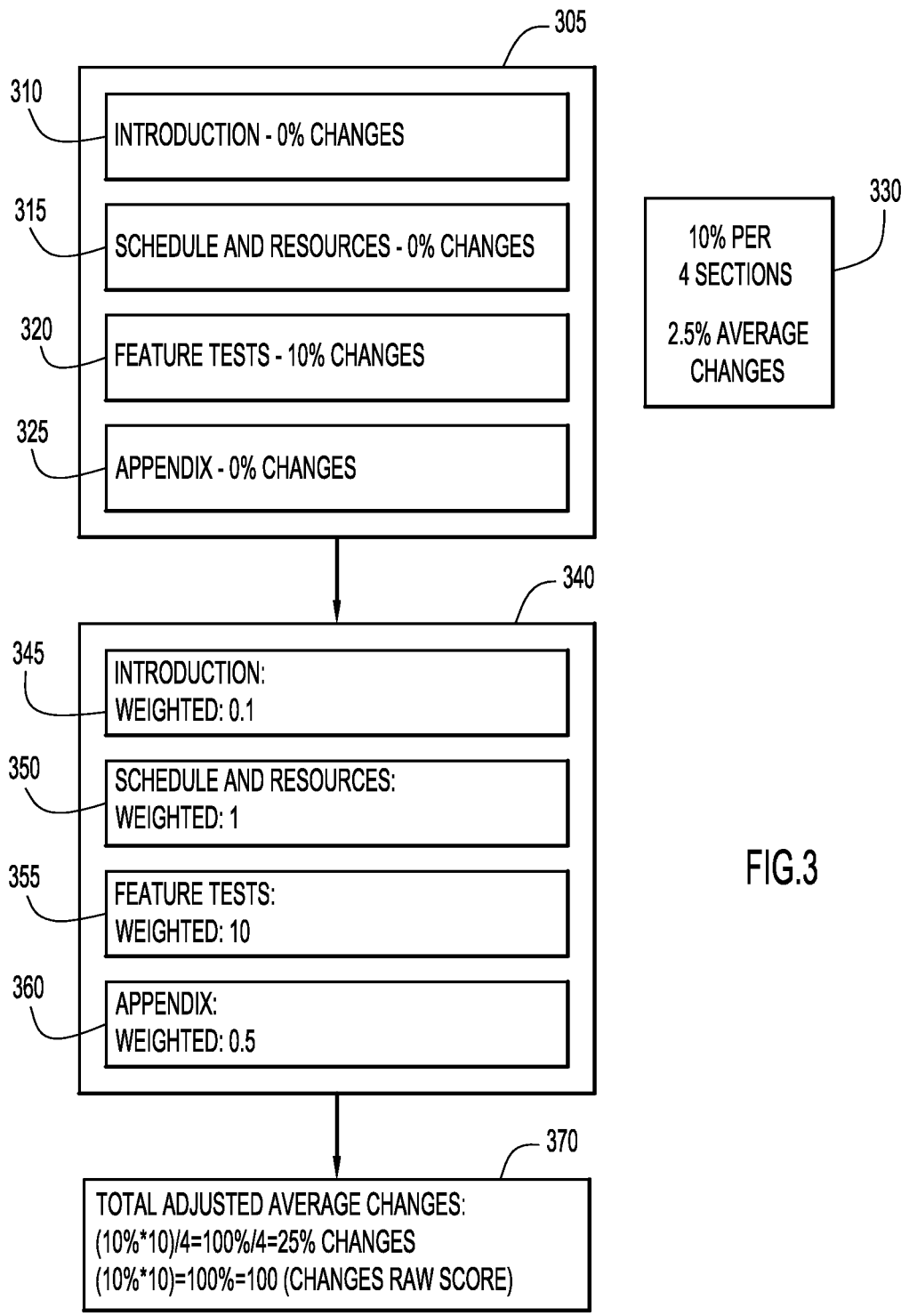
FIG. 3 is a flow chart diagram illustrating a manner in which example document sections are weighted according to a second example and scored based on changes in significant sections according to an embodiment of the present invention.

A second example of a manner in which weighting module 16 and scoring module 20 (e.g., via a server system 10 and/or client system 14) performs document change scoring for a document with changes to significant sections according to an embodiment of the present invention is illustrated in FIG. 3. As viewed in FIG. 3, there is a document section 305, a weighting section 340, and a scoring section 370. A test plan document revised from an original test plan (e.g., like that shown in FIG. 2) is depicted in abstract form at 305. The document has four sections, an introduction 310, a schedule and resources section 315, a feature tests section 320, and an appendix 325.

The introduction 310 has 0% changes, schedule and resources section 315 has 0% changes, feature tests section 320 has 10% changes, while appendix 325 has 0% changes. As described above, many techniques are available for determining changes between document versions (e.g., number of words or lines changed) and recorded as a document history or provenance value that is typically presented to a user as a percentage.

The provenance percentage value, whether a percent change or a percent of original content remaining, may be recorded as a provenance or document lineage metadata attribute. Accordingly, data differences between an original document and future document versions, as well as between document versions, may be recorded as lineage and/or provenance data and any additional ancillary data or document attributes (e.g., document change metadata) in order to record the entire change history of a document. For example, a document is partitioned into a plurality of sections. Each section of the document is assigned a corresponding weight value. A quantity of changes within each section is determined and the corresponding weight values are applied to the quantity of changes to produce a change score (i.e., section value) for each section. A change or provenance value is determined for the document indicating the degree of changes based on the change score for each section. Further, each section is associated with a provenance value. The change score for each section of the document is combined with a provenance value of each section of a previous version of the document to produce a new provenance value for each section. A current provenance value for the document is determined based on the new provenance value for each section. In this manner, a document's complete history can be presented to a user.

The results of the document change or difference processing (e.g., as executed by weighting module 16 and scoring module 20) can also be presented in other ways than a percentage value or numerical figure. For example, for text documents, there can be various types of "intelligent reporting" of the changes that triggered the provenance and lineage changes, such as denoting which user made which changes (e.g., an engineer making changes may be of more import that changes made by a documents standards clerk to ensure a proper document format).

At this point, a simple change percentage may be calculated or generated at 330. The change percentages from feature tests section 320 is averaged across all four document sections, i.e., introduction 310, schedule and resources section 315, feature tests section 320, and appendix 325. The 10% change from feature tests section 320 is divided by four (sections) to yield an average change of 2.5% per section as indicated at 330.

As described in connection with FIG. 2, a more complete score according to the techniques described herein is provided by weighting section 340 that provides a relative weight for each corresponding document section, i.e., weights 345, 350, 355, and 360, for document sections, 310, 315, 320, and 325, respectively (e.g., as executed by weighting module 16 and scoring module 20). In this example, the document sections are given the same weights as those given in FIG. 2. Introduction 310 is given a weight 345 of 0.1, scheduling section 315 is given a weight 350 of 1.0, feature test section 320 is given a weight 355 of 10.0, and appendix 325 is given a weight 360 of 0.5.

Once changes in the various document sections 305 are determined or identified, the weights can be applied to each document section 310, 315, 320, and 325 using weights in weighting section 340. Potential change scores are calculated by scoring section 370 (e.g., by way of scoring module 20). Scoring section 370 shows two possible change scoring values. The first is a raw change score of 100% or 100 as calculated in the lower part of scoring section 370. The upper score in section 370 is the same score of 100 divided by the number of document sections, in this case 4, to yield a score of 25% changes or 25.

Two examples of documents change scoring have been described in connection with FIGS. 2 and 3. Even though the example in FIG. 3 had 10% changes when compared to the 90% changes for the example shown in FIG. 2, the example in FIG. 3 generated a raw score of 100, which is four times greater than the raw score of 25 generated for FIG. 2, since the changes occurred in a section having a much greater significance (as indicated by the corresponding weight).

Figure 4A:
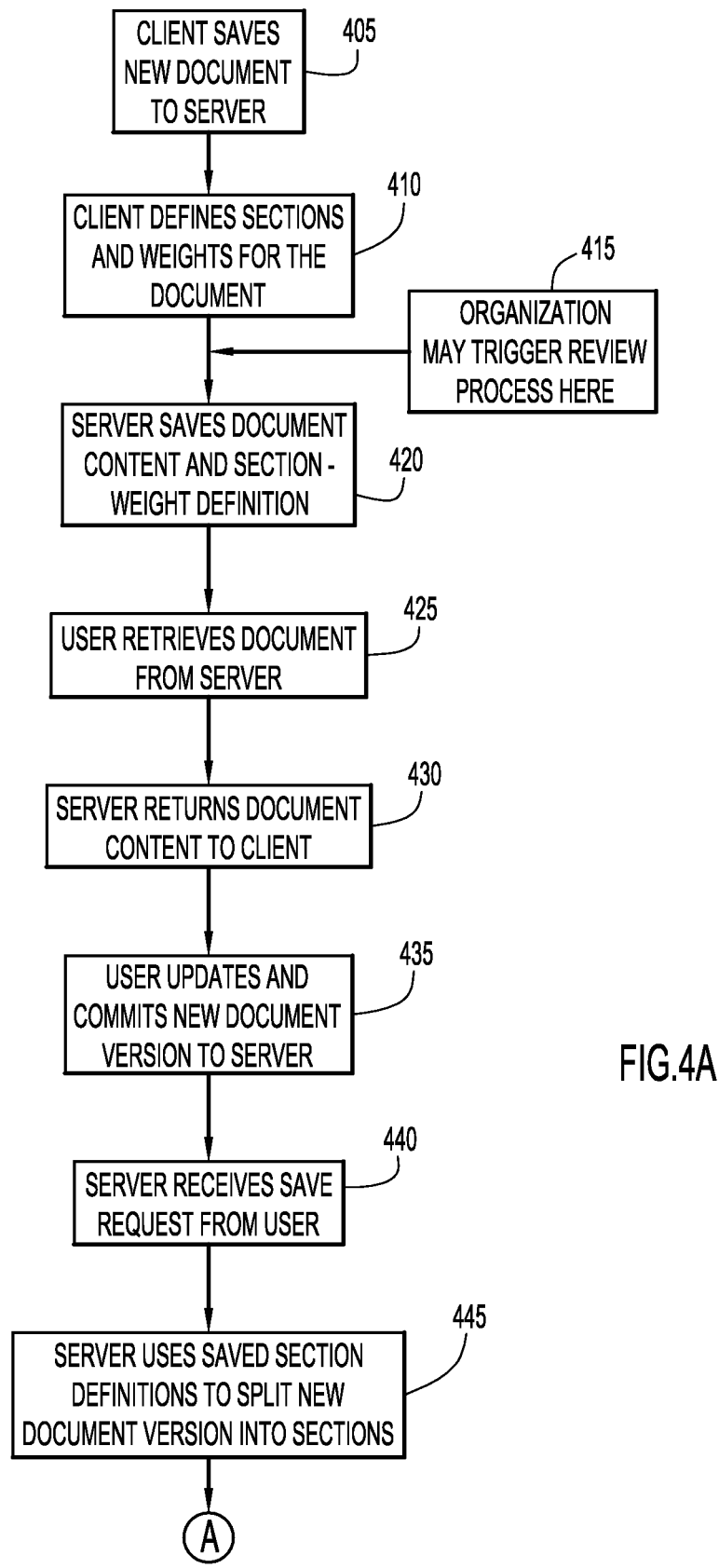
FIGS. 4A and 4B are a procedural flow chart illustrating a manner in which changes in document versions are scored according to an embodiment of the present invention.
Figure 4B:
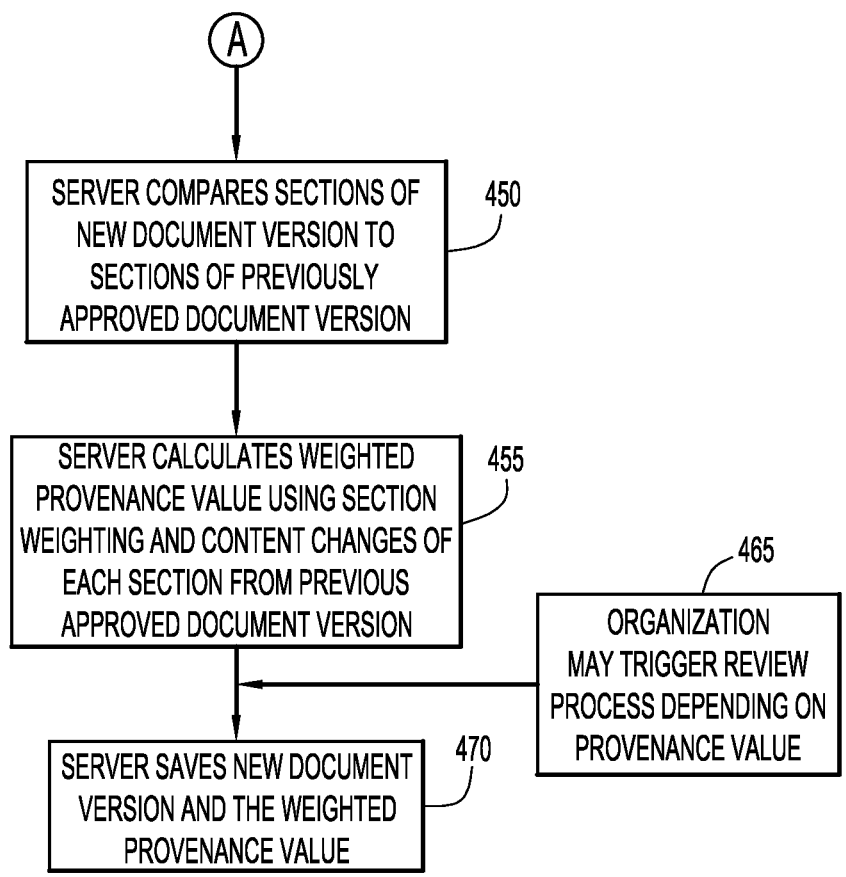

A more generalized manner in which weighting module 16 and scoring module 20 (e.g., via a server system 10 and/or client system 14) performs document change scoring according to an embodiment of the present invention is further illustrated in FIGS. 4A and 4B. A client device or user saves a new or original document to a storage device or server at step 405. For example, a newly created document is stored and catalogued into content management system (CMS).

In a CMS, data or content can be defined as documents, movies, pictures, phone numbers, scientific data, and the like. CMSs are frequently used for storing, controlling, revising, and publishing documents. CMSs may enable a large number of people to collaborate, contribute to and share stored data. The CMS controls access to data based on user roles that define which information users or user groups can view, edit, publish, etc. The CMS manages storage and retrieval of data, reduces repetitive or duplicate input, improves communication between users, and assists in report generation (e.g., document change reports). Serving as a central repository, the CMS typically increases the version level of new updates to an already existing file (e.g., the CMS has the ability to collect and track data for content in the CMS, which may include authors, change dates and file versions, as well a document change metrics).

An administrative user (e.g., by way of client systems 14) defines both document sections (e.g., sections like those described for test documents 205 and 305 above) and the weights to be assigned to the various sections at step 410. The definition of sections and weights may be used by all subsequent users editing subsequent versions of the document. Alternatively, the assigned weights may be automatically assigned by the CMS based on known characteristics of documents within the CMS. By way of example, in any given environment such as for a device test environment, design documents, test documents, and device version release documents may be part of a CMS for a company's product line. As such, these types of documents will each have a similar structure and a document section weight may be automatically assigned by weighting module 16 by parsing any given document based on known or learned document structures and/or document sections.

At this point in a document's history, any given organization may trigger a document review process at step 415. The document review process determines whether the content in the new document meets organizational standards, and that the associated section and weight definitions are appropriate prior to releasing the new document an original document version (or subsequent document version). A server (e.g., a CMS server as one of server systems 10) saves the document content and section weight definitions at step 420.

When a document revision or update is needed, a user retrieves the document (e.g., via client systems 14) at step 425. The server (e.g., server systems 10) returns the document at step 430. The user updates the document content at step 435. The server receives a document save request from the user at step 440. At this point, the server uses the section definitions stored at step 420 to split the new document version into sections at step 445 (e.g., by weighting module 16).

Referring the FIG. 4B, the server compares the new document version (or subsequent document version) sections to the corresponding sections of the document's previously approved version at step 450. The server combines differences in each section with the defined weight for each section to calculate a weighted provenance value at step 455 (e.g., by scoring module 20). For example, if a previous document revision had a small change score that did not trigger a document review, that revision may not be considered an approved version for the purposes of an organizational review, but may be a conditionally approved document for which additional modifications may be based until a review is warranted (e.g., a formal review). Only the most recent revision that had gone through a review process and had been approved will be used to compare against.

At this point in a document's history, the organization may trigger a document review process at step 465. The document review process is triggered based on the weighted provenance calculated at step 455. If the new provenance value indicates that substantial changes have been made to the new version (e.g., the change score or provenance value exceeds a threshold), then the organization's procedures may indicate that review of the new document version is in order. The server saves the new document version and the calculated weighted provenance value at step 470.

It will be appreciated that the embodiments described above and illustrated in the drawings represent only a few of the many ways of implementing document provenance scoring based on changes between document versions.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, weighting module, scoring module, etc.). These systems may include any types of monitors and input devices (e.g., keyboard, mouse, voice recognition, etc.) to enter and/or view information.

It is to be understood that the software (e.g., weighting module, scoring module, etc.) of the present invention embodiments may be implemented in any desired computer language and could be developed by one of ordinary skill in the computer arts based on the functional descriptions contained in the specification and flow diagrams and charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams and charts may be modified in any manner that accomplishes the functions described herein. In addition, the functions in the flow diagrams and charts or description may be performed in any order that accomplishes a desired operation.

The software of the present invention embodiments (e.g., weighting module, scoring module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., documents, documents collection, document section weight values, provenance values, and change scores, etc.). The database system may be implemented by any number of any conventional or other databases, data stores or storage structures (e.g., files, databases, data structures or tables, data or other repositories, etc.) to store information (e.g., documents, document collections, document section weight values, provenance values, change scores, etc.). The database system may be included within or coupled to the server and/or client systems. The database systems and/or storage structures may be remote from or local to the computer or other processing systems, and may store any desired data (e.g., documents, document collections, document section weight values, provenance values, and change scores, etc.). Further, the various tables (e.g., section lists, weighting tables, provenance or scoring values, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for determining any desired provenance information (e.g., change determination functions, etc.) from any type of document or other object (e.g., speech transcript, web or other pages, word processing files, spreadsheet files, presentation files, electronic mail, multimedia, etc.). the document may contain text in any written language (e.g. English, Spanish, French, Japanese, etc.). The partitioning of documents may be based on a logical sectioning of the document by the author, by paragraphs, or by a concentration of known keywords of interest (e.g., according to a technology or based an organizations keyword priority). For example, a medical document may be partitioned based on key medical terms or mechanical design document may be portioned based on terms of the mechanical arts.

Change percentages may be developed using any manner of analysis (e.g., linguistic, semantic, statistical, number of lines changes, number of words changed, etc.) and may be expressed in any values or units (e.g., raw score, quantity of change, percentage, etc.). The weighting values may be computed in any manner. For example, the weight values be normalized such that the total of all weights is 1.0 (or 100%), or may be given any real number such as those weights describe above in connection with FIGS. 2 and 3.

The present invention embodiments may employ any number of any type of user interface (e.g., Graphical User Interface (GUI), command-line, prompt, etc.) for obtaining or providing information (e.g., documents, document collections, sections for partitioning, weights values, change reports, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for computing change scores or provenance values based on weights assigned to various sections of document or other objects.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
    a computer system including at least one processor to track revisions to a document relative to a plurality of prior versions of the document, wherein the at least one processor is configured to:
        determine a change score for each section of the document by applying a percentage of changed lines of text between each section of the document and each corresponding section of a prior version of the document to a corresponding section weight value indicating significance of each section;
        combine the change score for each section of the document with a change score for each corresponding section of the prior version of the document to produce a provenance value for each section of the document, wherein the change score for each corresponding section of the prior version of the document is determined by applying a percentage of changed lines of text between each section of the prior version of the document and each corresponding section of a version of the document that precedes the prior version of the document to a section weight value for each corresponding section of the prior version of the document, and wherein the provenance value for each section of the document indicates changes to that section relative to the plurality of prior versions of the document;
        determine a provenance value for the document based on the provenance value for each section of the document;
        in response to a determination that the provenance value for the document exceeds a threshold, trigger a detailed document review process on a content management system; and
        in response to a determination that the provenance value for the document does not exceed the threshold, trigger a brief document review process on the content management system.

2. The system of claim 1, wherein the prior version of the document is an approved version of the document.

3. The system of claim 1, wherein the document is partitioned into a plurality of sections and a section weight value is assigned to each of the plurality of sections.

4. The system of claim 1, wherein the provenance value for the document is an average of the provenance value for each section of the document.

5. A computer program product comprising:
    a computer readable storage device having computer readable program code embodied therewith to track revisions to a document relative to a plurality of prior versions of the document, the computer readable program code comprising computer readable program code configured to:
        determine a change score for each section of the document by applying a percentage of changed lines of text between each section of the document and each corresponding section of a prior version of the document to a corresponding section weight value indicating significance of each section;
        combine the change score for each section of the document with a change score for each corresponding section of the prior version of the document to produce a provenance value for each section of the document, wherein the change score for each corresponding section of the prior version of the document is determined by applying a percentage of changed lines of text between each section of the prior version of the document and each corresponding section of a version of the document that precedes the prior version of the document to a section weight value for each corresponding section of the prior version of the document, and wherein the provenance value for each section of the document indicates changes to that section relative to the plurality of prior versions of the document;
        determine a provenance value for the document based on the provenance value for each section of the document;
        in response to a determination that the provenance value for the document exceeds a threshold, trigger a detailed document review process on a content management system; and
        in response to a determination that the provenance value for the document does not exceed the threshold, trigger a brief document review process on the content management system.

6. The computer program product of claim 5, wherein the prior version of the document is an approved version of the document.

7. The computer program product of claim 5, wherein the document is partitioned into a plurality of sections and a section weight value is assigned to each of the plurality of sections.

8. The computer program product of claim 5, wherein the provenance value for the document is an average of the provenance value for each section of the document.

9. The computer program product of claim 5, wherein the computer readable program code further comprises computer readable program code configured to:

learn structures of a plurality of different types of documents;

parse the document into sections and generate the corresponding section weight value for each section of the document based on the learned structures, wherein generating the corresponding section weight value for each section of the document comprises:

applying linguistic analysis to each section of the document to determine a significance of that section and assigning a section weight value to each section of the document based on the determined significance of that section.

10. The system of claim 1, wherein the percentage of changed lines of text for sections of document versions is based on a ratio of a number of changed lines of text to a number of remaining unchanged lines of text between corresponding sections of the document versions.

11. A computer-implemented method to track revisions to a document relative to a plurality of prior versions of the document comprising:

determining, via a processor, a change score for each section of the document by applying a percentage of changed lines of text between each section of the document and each corresponding section of a prior version of the document to a corresponding section weight value indicating significance of each section;

combining, via the processor, the change score for each section of the document with a change score for each corresponding section of the prior version of the document to produce a provenance value for each section of the document, wherein the change score for each corresponding section of the prior version of the document is determined by applying a percentage of changed lines of text between each section of the prior version of the document and each corresponding section of a version of the document that precedes the prior version of the document to a section weight value for each corresponding section of the prior version of the document, and wherein the provenance value for each section of the document indicates changes to that section relative to the plurality of prior versions of the document;

determining, via the processor, a provenance value for the document based on the provenance value for each section of the document;

in response to a determination that the provenance value for the document exceeds a threshold, triggering, via the processor, a detailed document review process on a content management system; and in response to a determination that the provenance value for the document does not exceed the threshold, triggering, via the processor, a brief document review process on the content management system.

12. The computer-implemented method of claim 11, wherein the prior version of the document is an approved version of the document.

13. The computer-implemented method of claim 11, wherein the document is partitioned into a plurality of sections and a section weight value is assigned to each of the plurality of sections.

14. The computer-implemented method of claim 11, wherein the provenance value for the document is an average of the provenance value for each section of the document.

15. The computer-implemented method of claim 11, further comprising:

learning, via the processor, structures of a plurality of different types of documents;

parsing, via the processor, the document into sections and generating the corresponding section weight value for each section of the document based on the learned structures, wherein generating the corresponding section weight value for each section of the document comprises:

applying linguistic analysis to each section of the document to determine a significance of that section and assigning a section weight value to each section of the document based on the determined significance of that section.

16. The system of claim 1, wherein the at least one processor is further configured to:

learn structures of a plurality of different types of documents;

parse the document into sections and generate the corresponding section weight value for each section of the document based on the learned structures, wherein generating the corresponding section weight value for each section of the document comprises:

applying linguistic analysis to each section of the document to determine a significance of that section and assigning a section weight value to each section of the document based on the determined significance of that section.

* * * * *